INVENTORS
HARVEY G. CRAGON
HENRY N. PETERSON

ATTORNEY

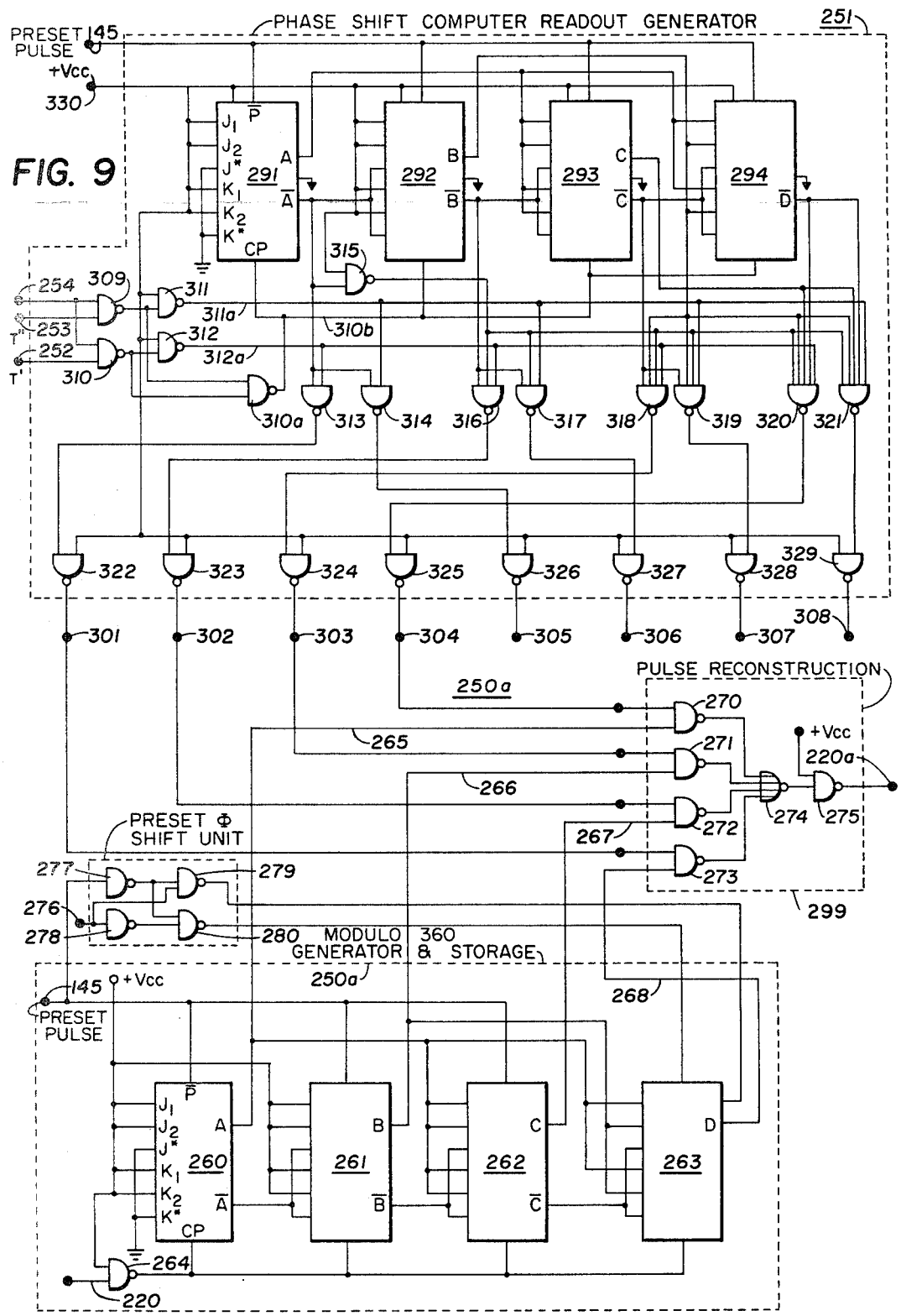

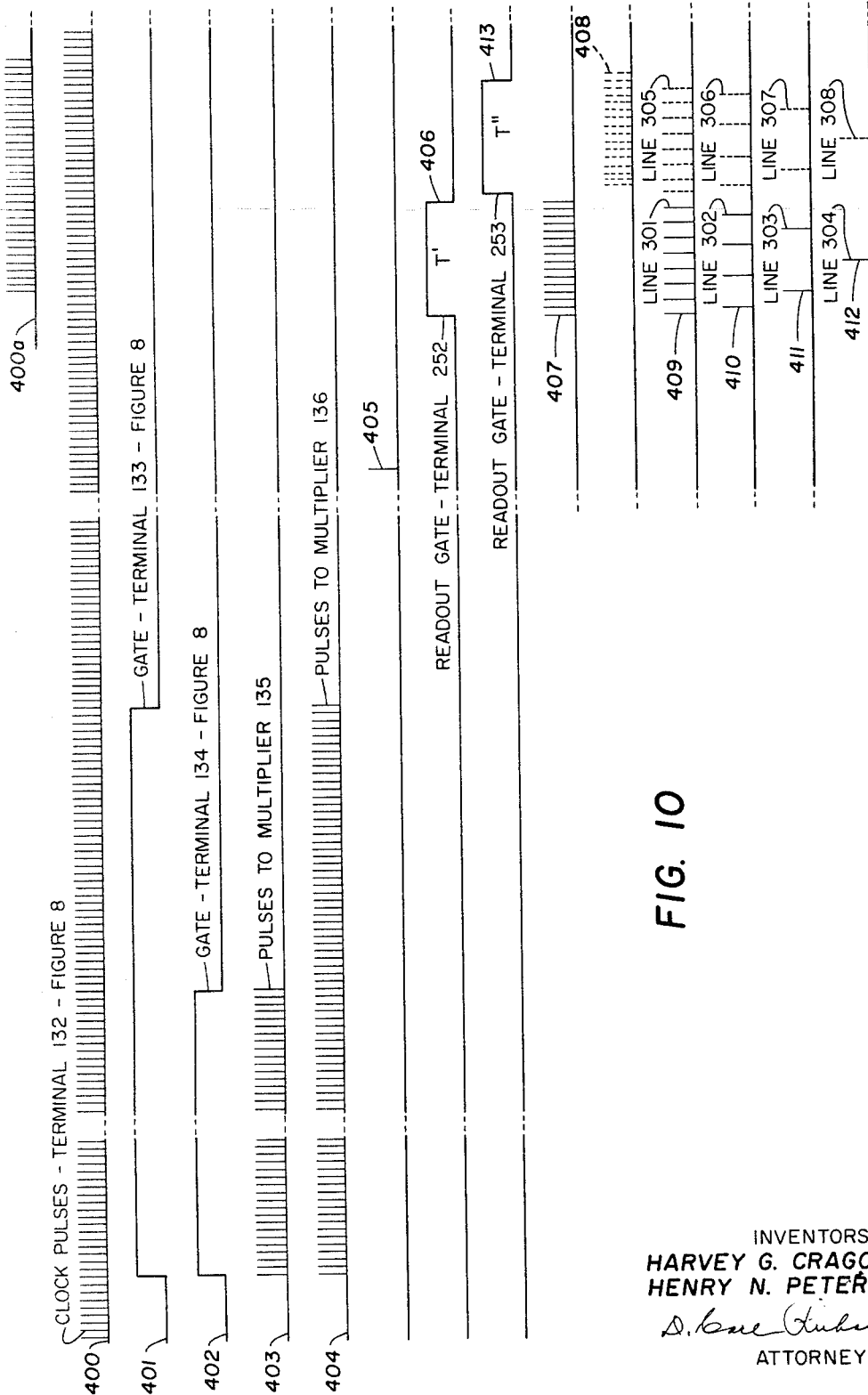

United States Patent Office 3,403,401
Patented Sept. 24, 1968

3,403,401
DIGITAL PHASE SHIFT CONTROL FOR PHASED ARRAY RADAR
Harvey G. Cragon, Dallas, and Henry N. Peterson, Richardson, Tex., assignors to Texas Instruments Incorporated, Dallas, Texas, a corporation of Delaware
Filed Nov. 25, 1966, Ser. No. 597,003
10 Claims. (Cl. 343—100)

ABSTRACT OF THE DISCLOSURE

Phase shift across a phased array radar antenna is controlled, for transmitting the radar signals to antenna elements, through a delay means of variable length provided for each element, by the use of clock pulses in a pulse counting and dividing logic to apply graded numbers of pulses corresponding with the desired phase shifts to switching elements which control the effective electrical length of the delay means.

---

This invention relates to control of a radar involving microwave modular antenna, and more particularly to digital phase shift control of a multielement phased array antenna.

This invention is particularly advantageous in connection with the construction and operation of airborne radar, but also has important application in ground-based and ship-based systems. Areas of application include radars used for ground mapping, search and detection, fire control, tracking, navigation, terrain following, and terrain avoidance. With this invention, the radar may be operated in any one of the above modes or in several of such modes on a time-sharing basis.

Airborne radar systems inherently have a problem of generating high power microwave energy and processing the transmitted and received signals while maintaining high reliability and minimum weight. Major reliability problems in radars have been concerned with components such as rotary joints, servomotors for the antennas, and the like. Restrictions imposed by such components on reliability exist in the most contemporary transistorized radars. Further, the use of magnetrons for transmitting, klystrons for local oscillator service, and use of high power transmit-receive (TR) protection devices, all have been found to restrict the reliability of the system.

The present invention is directed to an improved radar which may employ solid-state circuitry so constructed that major obstacles heretofore encountered in the development of solid-state radar may be overcome. A solid-state functional electronic module has been developed for construction of a modular antenna array responsive to beam steering control disclosed in application Ser. No. 397,491 of Harry F. Cooke, et al., filed Sept. 18, 1964, now abandoned in favor of continuation application Ser. No. 676,362 of Harry F. Cooke et al., filed Oct. 18, 1967. Such modules may be operated at an adequate power level at microwave frequencies of, for example, 9 gc. ($9 \times 10^9$ cycles per second). A lightweight multielement array antenna formed of such modules uses electronic beam scanning and eliminates wave guides, rotary joints, motors, synchros, gears and other servo components normally essential to a scanning system. A substantial reduction in total volume and weight over known or existing radars is achieved. This is accompanied by a substantial increase in the reliability of the system.

By the present invention individual phase control for electronic beam steering is provided for each individual antenna module.

For a more complete understanding of the present invention and for further objects and advantages thereof, reference may now be had to the following description taken in conjunction with the accompanying drawings in which:

FIGURE 1 diagrammatically illustrates the operation of an aircraft, its antenna array, and the functional electronic block employed to make up the array;

FIGURE 9 is a detailed circuit diagram of a portion of the system of FIGURE 8; and FIGURE 10 illustrates time relationships in FIGURES 8 and 9.

Figure 1:
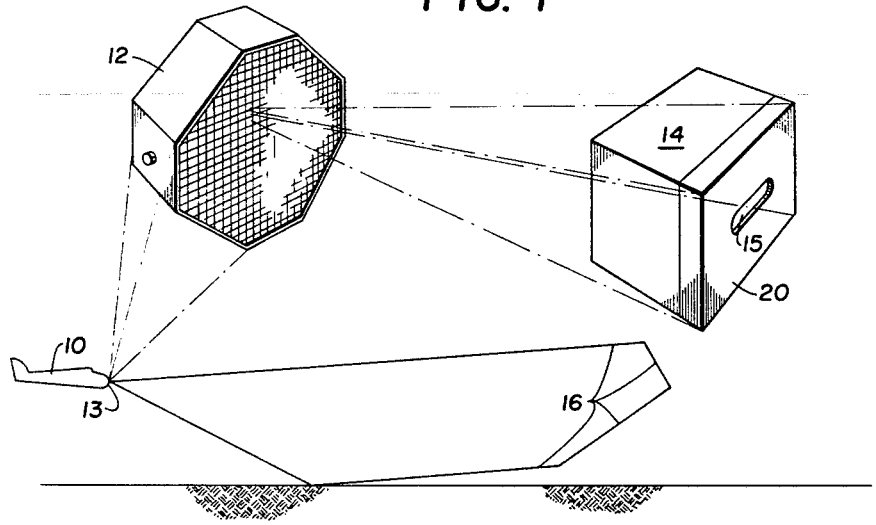

The invention will be described as it is employed in a terrain-following mode of a multimode airborne radar. In such a radar, an aircraft 10 may have an antenna unit 12 mounted in the nose 13. Antenna unit 12 is comprised of a multiplicity of functional electronic blocks, such as the block 14. In the example illustrated in FIGURE 1, 604 such blocks make up an antenna array of octagonal shape. The face of each block is of the order of one inch (1") square. Block 14 is adapted to be plugged into a suitable frame in the antenna unit 12 to transmit and receive electromagnetic energy by way of slot 15.

The video information made available by the radar is then processed to provide terrain-following capabilities. For example, in accordance with one mode of operation employed in a system known as the template system, a premaster trigger is supplied to a template generator concurrently with each transmitted pulse from the antenna unit 12 to initiate a synthetic echo. This echo or template trigger occurs at a time range that is based upon the desired clearance altitude, the characteristics of the air frame, and the scan position. The range of the template trigger changes with the scan angle. The scan angle is varied by adjusting the relative phase relationships between the microwave energy applied to each of the modules in the antenna unit 12 during one vertical scan. The scan angle defines the template shape such as illustrated in FIGURE 1 by the outline 16. The video return or received signals are compared with the synthetic echos to obtain proportional command signals. The video return signal received before the synthetic echo signal is employed to generate climb commands. Similarly, the video return signal received after the synthetic echo generates dive commands.

By the present invention the phase of the transmitted and the received signals in a multielement, phased antenna array is controlled. Unique structural and functional relationships between integrated semiconductor circuits are employed for antenna excitation and for beam steering.

Figure 2:
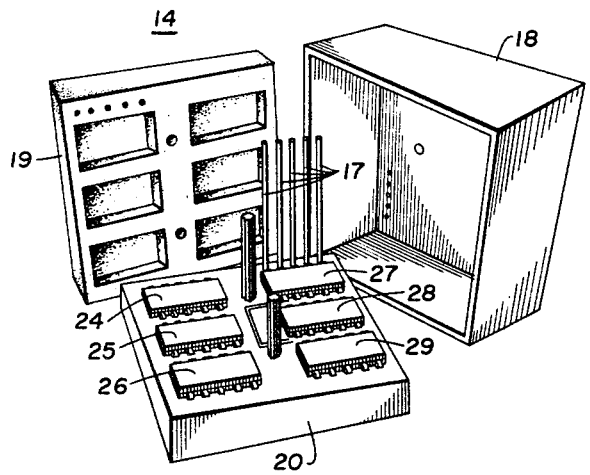
FIGURE 2 illustrates one form of a solid-state antenna module.

The modules of antenna unit 12 are of identical construction and may be of the character illustrated in FIGURES 1 and 2, where a planar face member 20 is provided with a slot 15 leading to microwave circuits which are excited by pulses of an RF carrier, e.g.: (preferably of) X-band frequency, in the system illustrated herein.

Antenna module 14 preferably includes its own power generation circuit and receiver preamplifier circuit and its own phase shift circuit for beam steering. Included in the block 14 are a plurality of integrated circuits 24–29 which have the same gross appearance as units manufactured and sold by Texas Instrument Incorporated of Dallas, Tex., under the trademark "Solid Circuits," and which provide for phase shift control as will be hereinafter described. The face member 20 mates with a packing member 19 which is to be mounted in an enclosure 18 with leads 17 extending through the back thereof to facilitate plug in assembly.

The size of the module is limited by the allowable spacing between radiating elements for avoidance of spurious grating lobes.

SYSTEM BLOCK DIAGRAM

Figure 3:
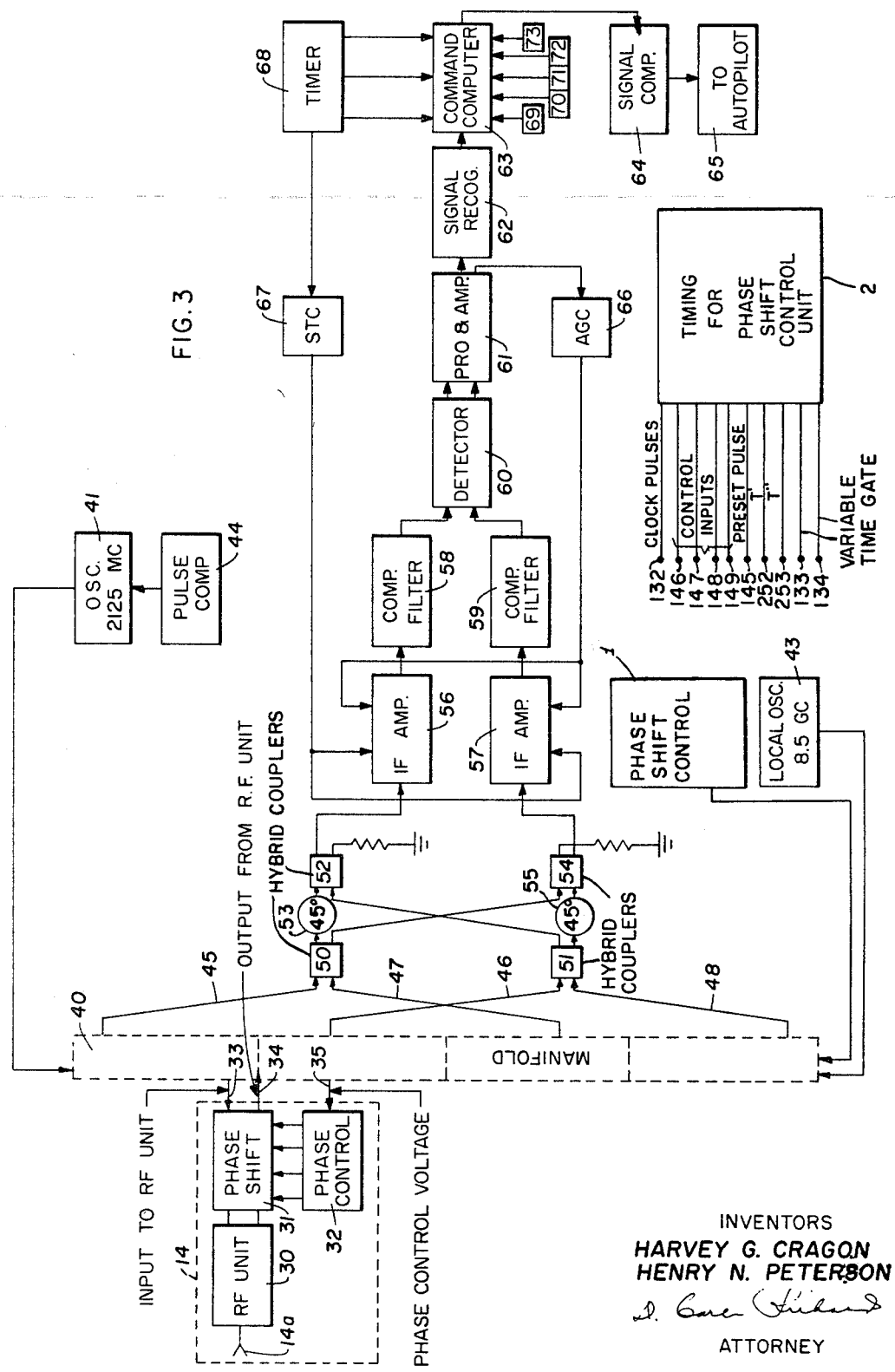
FIGURE 3 is a block diagram of the multimode radar of FIGURE 1 in which the present invention is employed.

In order to provide a setting for the present invention the system shown in FIGURE 3 includes module 14. An RF unit 30, a phase shift unit 31, a control network 32, and a radiator 14a are included as primary elements in module 14. The phase shift network 31 receives low-power RF carrier pulses from the processor system by way of a channel 33 and delivers output signals of IF frequency by way of channel 34. A beam steering or phase control signal is applied to the control network 32 by way of channel 35 from phase shift control 1.

While only one module 14 has been shown in FIGURE 3, it is to be understood that the 604 blocks illustrated in the antenna unit 12 of FIGURE 1 will similarly be excited and controlled from a manifold 40.

A source 41 supplies a pulsed RF carrier at 2.125 gc. to manifold 40 under the control of a pulse compression generator 44. Phase shift control 1 inserts a predetermined amount of phase shift into each radar signal generated in each RF unit 14. It is this aspect of the radar system to which this invention is directed. Various timing functions for the phase shift control unit 1 are generated in the timing for phase shift control unit 2 shown in FIGURE 3.

A local oscillator 43 applies a continuous low level voltage to manifold 40 at a frequency of 8.5 gc. Output signals at an IF frequency appear on channel 34 and are applied from module 14 to manifold 40. As indicated, the IF signals from modules in the upper quarter of the antenna unit 12 are summed and appear on output channel 45. The sum of the IF output signals from the upper center quarter of the antenna unit 12 appears on channel 46. The sum of the IF output signals from the lower center quarter of the antenna unit 12 appears on channel 47, and corresponding signals from the lower quarter of antenna unit 12 appear on output channel 48.

Channels 45 and 47 are connected to the inputs of a 3 db hybrid coupler 50. The signals on channels 46 and 48 are applied to the inputs of a coupler 51. One output from coupler 50 is applied to a coupler 52 by way of a 45° phase delay unit 53. The second input to coupler 52 is supplied by one output of coupler 51. In a similar manner, a fourth coupler 54 is supplied by way of a phase delay unit 55 and by coupler 50. The output signals from couplers 52 and 54 are applied to IF amplifiers 56 and 57, respectively, which in turn feed pulse compression filters 58 and 59. Detector 60 is driven by output signals from filters 58 and 59 and in turn drive a monopulse resolution improvement processor and video amplifier 61. A signal recognition circuit 62 excited by unit 61 drives a command computer 63, one output of which may be applied by way of a signal computer 64 to an autopilot 65.

An automatic gain control (AGC) 66 excited by the output of unit 61, controls IF amplifiers 56 and 57. A sensitivity time control (STC) unit 67 also feeds IF amplifiers 56 and 57 under the control of a timer synchronizer 68. Synchronizer 68 also feeds the command computer, as do command input function generators 69–73. Generator 69 is a scan computer indicating the direction of the antenna beam. If an object is present, then the system generates a control signal for autopilot 65. Generator 70 provides a signal representative of velocity of the aircraft. Generator 71 generates a signal representative of the actual flight vector. Generator 72 is a ride control generator, and determines whether a rough or smooth course is followed, i.e., how abruptly the aircraft will change attitude when a target or obstacle is sensed. Generator 73 generates a signal representative of the aircraft pitch angle.

FIGURE 4

In the light of the foregoing description and with a knowledge of the various modes of operation of radar, it will be recognized that exacting requirements are placed upon excitation of the elements to be included in module 14. In order to provide antenna power at the level necessary, properly phased, solid-state circuits preferably are employed. The desired versatility and control of the system appears to be most readily achieved by use of solid-state semiconductor networks. As above indicated, each antenna module has its ow phase shift unit and control network as shown in block form in FIGURE 3.

Figure 4:
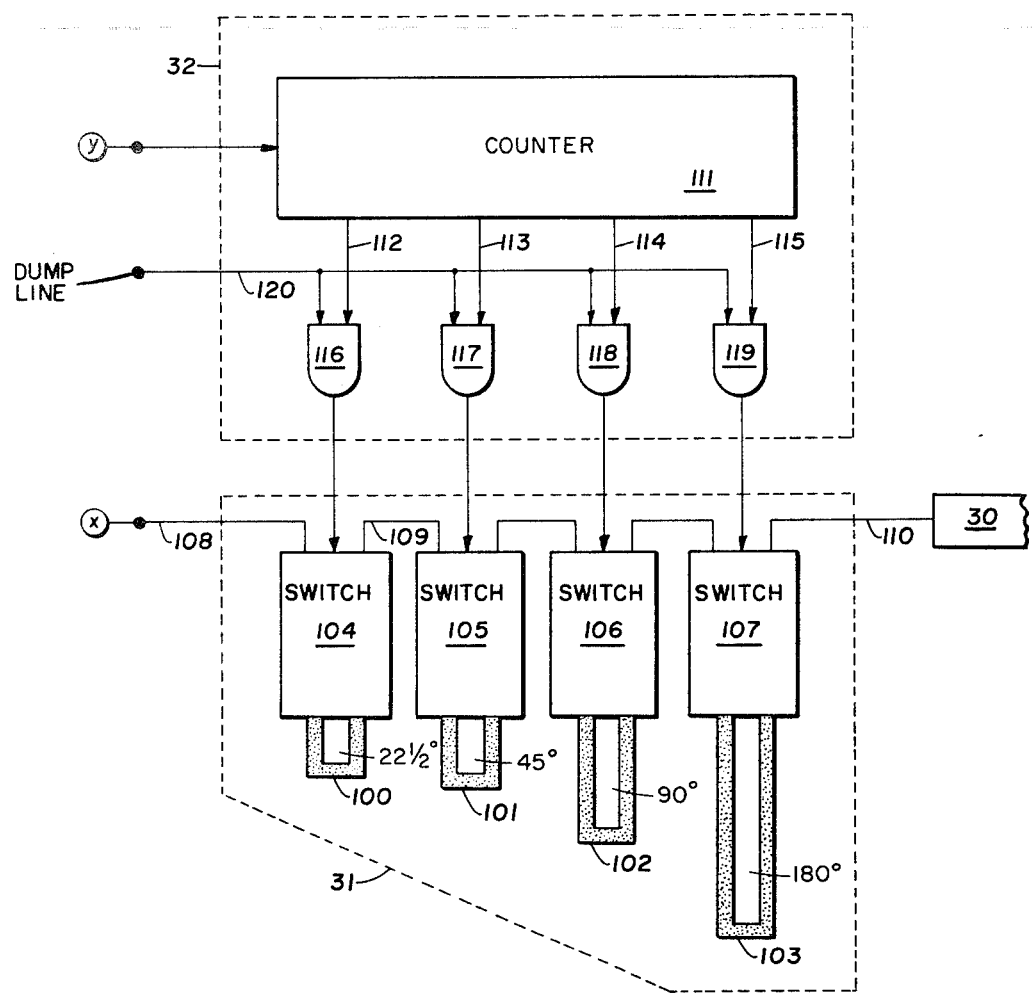
FIGURE 4 illustrates a phase shift unit which is incorporated in and used with each module of the antenna.

In FIGURE 4, the phase shift unit 31 has been shown in relation to the phase control unit 32. The phase shift unit 31 has an input terminal X and includes four delay lines 100–103. The delay line 100 provides a delay of 22.5° at the frequency of the signal applied to terminal X. Units 100, 101, 102 and 103 provide delays of 22.5°, 45°, 90° and 180°, respectively. The units are connected by way of switches 104–107 to the line 108. To illustrate the operation, with the switch 104 in one condition, the signal on line 108 passes through the delay line 100. In the other condition the signal on line 108 passes directly to line 109. Thus, by closing switches 104–107 selectively, any phase shift (in steps of 22.5°) can be introduced between 0° and 337.5° by closing the switches 104–107 in an ordered manner. The sigal from line 108 ultimately passes by way of line 110 to the RF unit 30. The energy thus delayed in unit 31 is applied by the RF unit 30 to a suitable radiating element. Return signals similarly pass back through the phase shift unit 31 for processing and utilization.

The selection of the phase delay in the unit 31 is determined by the phase control unit 32. The phase control unit 32 includes a counter 111 having four output lines 112–115 leading to AND gates 116–119. The second of the inputs to AND gates 116–119 are controlled by the voltage state on a dump line 120.

FIGURE 5

In accordance with the present invention, the pulses from a suitable clock source are divided down in rate and fed to the terminal Y leading to the counter 111 for a time gate proportional to the desired phase shift in the unit 31. Further, the pulses at the counter 111 are divided down from the clock rate differently than for other such counters so that the phase shift in the unit which contains the circuit 31 of FIGURE 4 will be coordinated with and related to the phase shift in every other unit in the antenna. More particularly, it will be noted that the terminal Y of FIGURE 4 is excited by way of the NAND gate 130 located at the lower right hand corner of FIGURE 5. Thus excited the unit 31 of FIGURE 4 will be housed in the module located in the antenna array at a point which corresponds with the location of the intersection 131 of FIGURE 5.

There will be 603 additional units similarly excited. They have not been shown in FIGURE 5. However, it will be understood that an antenna 28 elements high and 28 elements wide is employed in this specific example. The corner elements are omitted as indicated in FIGURE 1. The location of elements in the antenna will correspond to the pattern of FIGURE 5.

Figure 5:
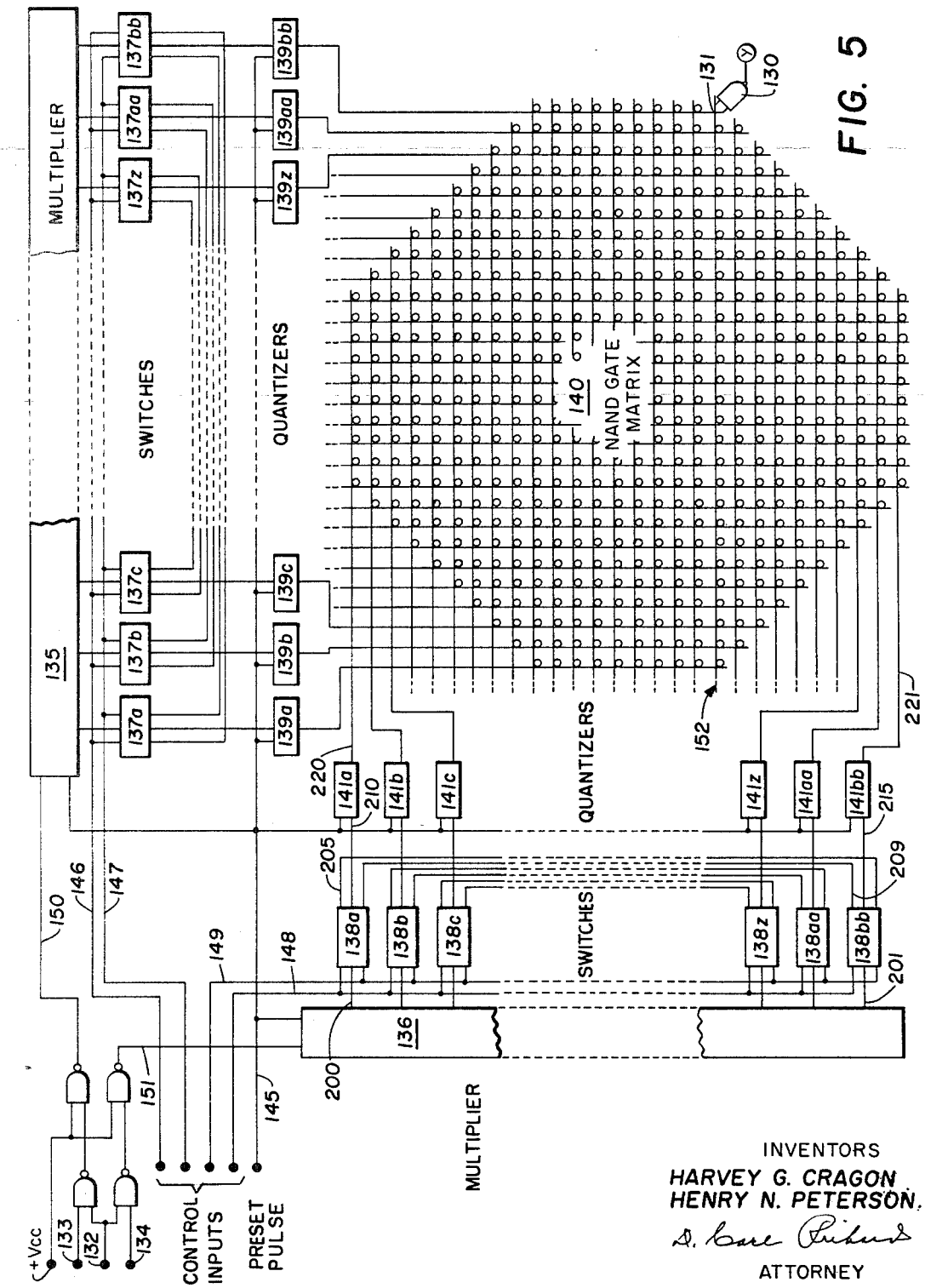
FIGURE 5 illustrates a phase shift pulse converter employed for the control of the several phase shift elements.

The system of FIGURE 5 operates in response to clock pulses generated in timing unit 2 (FIG. 3) which are applied at the input terminal 132. The pulses are divided down for application to terminal Y and to each of the points in the array corresponding thereto. As a result, a desired phase shift will be produced across the antenna face. The phase shift is selectively variable both in azimuth and elevation. A gate voltage generated in timing unit 2 (FIG. 3) and applied to terminal 133 controls the number of clock pulses transmitted and thus the phase shift for the azimuth. A voltage gate similarly generated in timing unit 2 (FIG. 3) and applied to terminal 134 controls the phase shift for the elevation.

Pulses gated to the system of FIGURE 5 are applied to an azimuth binary rate multiplier 135 and to an elevation binary rate multiplier 136. It will be appreciated that only phase *delays* can be produced by units such as shown in FIGURE 4. Recognizing this limitation the system must be capable of directing the beam from the antenna either to the right or to the left of bore sight. For this purpose, one set of shift switches 137a–137bb are employed. They serve to interchange ends of the binary rate multiplier 135 and opposite sides of the antenna array. Further, since it is desired to direct the beam both up and down relative to bore sight, a second set of switches 138a–138bb are employed to switch the binary rate multiplier 136.

A set of quantizers 139a–139bb connect the respective outputs of the multiplier 135 to vertical lines in a NAND gate matrix 140. Similarly, a set of quantizers 141a–141bb connect the outputs of the multiplier 136 to the horizontal lines in the NAND matrix 140. The quantizers, in this embodiment, count the pulses applied thereto down by a factor of eight.

A control line 145 is connected to the multipliers 135, 136 and to each of the quantizers 139a–139bb and 141a–141bb. Each of the switch elements 137a–137bb has one input line leading from the multiplier 135. A second input line 146 runs to a second terminal on all of the switch units 137a–137bb. A third input line 147 is connected to the third terminal of all of the switch units 137a–137bb.

Similarly, each of the switch units 138a–138bb has one input line leading from the multiplier 136. Further a line 148 is connected to a second terminal of all of the switch units 138a–138bb. A line 149 is connected to a third input on all of the switch units 138a–138bb.

It will be noted that one of the output lines from switch 137a extends to one input of the quantizer 139a. The second and third output lines from unit 137a are common to the second and third output lines from the switch unit 137bb. The first output line from the switch unit 137bb extends to the quantizer 139bb. Similarly, two lines from switches 137b and 137aa are common and two lines leading from switches 137c and 137z are common. Thus the switches 137a–137bb are operated in pairs.

With a control voltage state present on line 146 and *no* control voltage state present on line 147, clock pulses gated onto line 150 leading to multiplier 135 are applied by way of switches 137a–137bb to the quantizers 139a–139bb, respectively.

The structure of the multiplier 135 will be described in connection with FIGURE 6. However, it will be understood that output pulses will be produced at the inputs of the quantizers 139a–139bb in the ratio 1, 2, 3 . . . 28. Further, the structure and operation of the quantizers 139a–139bb will be described in connection with FIGURE 7. It will be understood that the pulses thus applied to the input of the quantizers are counted down by a factor of eight and it is only the latter pulses that are applied to the matrix 140. By reason of the nature of the logic in the quantizers 139a the output is a complement output. Thus a NAND gate 130 at the output of the matrix 140 will serve effectively in cooperation with the NAND logic in the quantizers to perform an overall OR function in the matrix. Thus, any pulse at the output of the quantizer 139bb will be transmitted to the terminal Y. Similarly, any pulse at the output of the quantizer feeding the line 152 will be transmitted to terminal Y.

When a control voltage state is present on line 147 and *not* present on line 146 (these states being generated in timing unit 2, FIG. 3) then the resultant pulses will be counted down with the multiplier 135 such that at the inputs of the quantizers 139a–139bb they will appear in the order 28, 27, 26 . . . 1.

A similar operation is performed in conjunction with the voltage states on control lines 148 and 149 (these states also being generated in timing unit 2, FIG. 3). If a control voltage state is on line 148 and *not* on line 149 then pulses gated onto line 151 and appearing at the outputs of the multiplier 136 and appearing at the inputs of quantizers 141a–141bb will be in the order 1, 2, 3 . . . 28. If the control state is present on line 149 and *not* on line 148 then the order of the number of pulses will be reversed.

Thus the voltage state on line 148 and 149 are controlled dependent upon whether or not the beam from the antenna for a given pulse sequence is to be up or down. The voltage states on control line 146 and 147 will be controlled and dependent upon whether or not the beam is to be directed to the right or to the left.

The magnitude of a deflection of the radar beam right or left is controlled by the length of the control gate applied to the terminal 133. This controls the number of clock pulses that are transmitted to the line 150. Similarly, the magnitude of deflection of a beam up or down is determined by the length of the control gate applied to the terminal 134.

FIGURE 6

Figure 6:
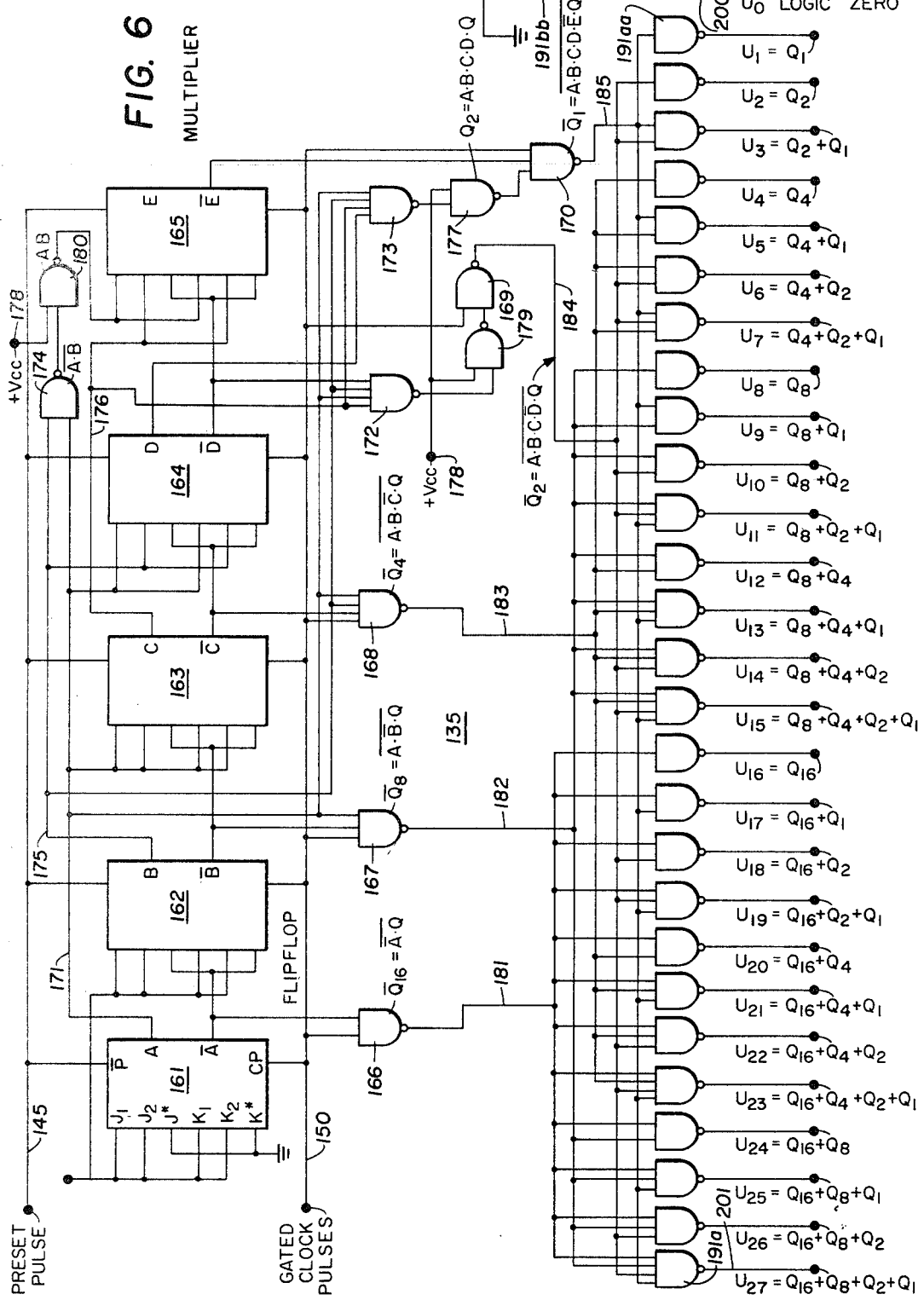
FIGURE 6 is a circuit diagram of a binary rate multiplier forming a part of FIGURE 5.

FIGURE 6 illustrates one form of a synchronous binary rate multiplier 135 employed in FIGURE 5. Multiplier 135 includes five flip-flops 161–165 of the type manufactured and sold by Texas Instruments, Inc., and identified as Series 54 integrated circuits. The line 150 is connected to the clock pulse input of each of the flip-flops. The line 150 is also connected to one input of each of five NAND gates 166–170.

The output A of flip-flop 161 is connected by way of line 171 to one input of NAND gates 167, 168, 172 and 173 as well as to appropriate logic input on flip-flops 163, 164 and to one input of NAND gate 174. The complement output $\overline{A}$ from flip-flop 161 is connected to the second input of NAND gate 166, and to flip-flop 162.

The output B from the flip-flop 162 is connected, by way of line 175, to the second input of NAND gate 174, to the second inputs of NAND gates 168, 172 and 173. The complement output $\overline{B}$ of flip-flop 162 is connected to the third input of NAND gate 167 and to flip-flop 163.

The output C of flip-flop 163 is connected by way of conductor 176 to the third input of NAND gate 172 and to the third input of NAND gate 173 as well as to flip-flop 165. The complement output $\overline{C}$ of the output of flip-flop 163 is connected to the fourth terminal of NAND gate 168 and to flip-flop 164.

The output D of flip-flop 164 is connected to the fourth input terminal of NAND gate 173. The complement output $\overline{D}$ of the flip-flop 164 is connected to the fourth terminal of NAND gate 172 and to the flip-flop 165. The complement $\overline{E}$ of the output of the flip-flop 165 is connected to the second terminal of NAND gate 170. The third terminal of NAND gate 170 is fed by way of a NAND gate 177 having one input fed by NAND gate 173 and a second input connected to a fixed control voltage terminal 178.

The second input to NAND gate 169 is supplied by way of NAND gate 179 which in turn is fed by the output of NAND gate 172 and the fixed control voltage from terminal 178.

The NAND gate 174 supplies one input of NAND gate 180, the second input of which is held at a fixed state from terminal 178. The output of NAND gate 180 is connected to flip-flop 165.

The five output lines 181–185 from the foregoing logic circuit control a bank of NAND gates 191a–191aa. The outputs of the NAND gates 191a–191aa feed the switches 137a–137bb of FIGURE 5.

The connections at the inputs to the NAND gates 191a–191aa are arranged to provide the respective output states noted in FIGURE 6. The 28th channel 191bb is a logic "0" state.

FIGURE 7

Figure 7:
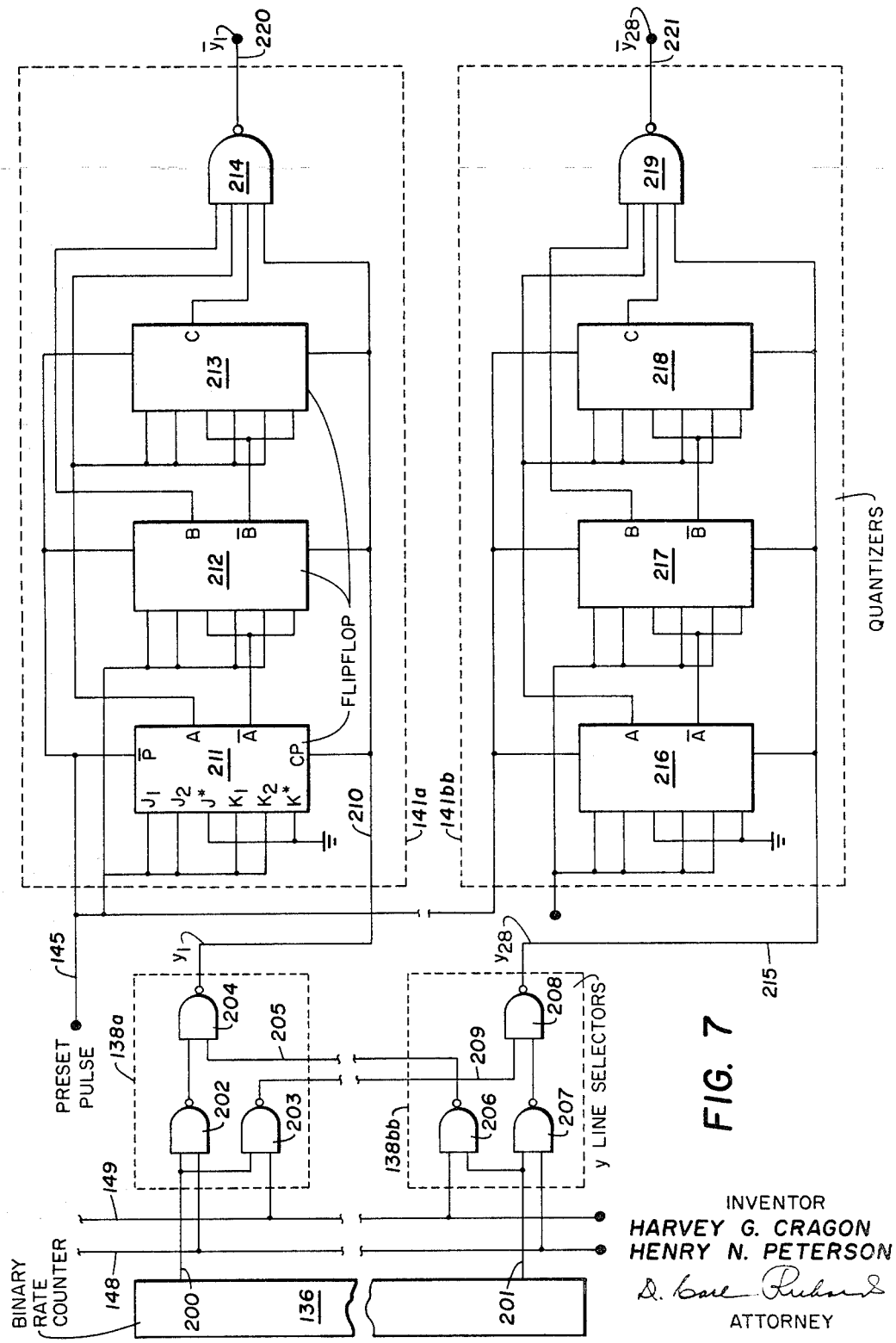
FIGURE 7 is a line selector and quantizer employed in the system of FIGURE 5.

In FIGURE 7 the construction of the line selectors 138a and 138bb and the quantizers 141a and 141bb are illustrated. In this system, divided clock pulses from the multiplier 136 are applied to the selector 138a by way of line 200. Similarly, pulses suitably divided by the multiplier 136 are applied to the selector 138bb by way of line 201. The selector 138a includes three NAND gates 202, 203 and 204. Line 200 is connected to one input of each of elements 202 and 203. Line 148 is connected to the second input of element 202 and line 149 is connected to the second input of gate 203. The output of gate 202 is connected to one input of gate 204. The second input of gate 204 is supplied by way of line 205 which leads from the output of gate 206 in selector 138bb. Line 201 leading from multiplier 136 is connected to one input of each of gates 206 and 207 in selector 138bb. The second input of gate 206 is connected to line 149, and the second input to gate 207 is connected to line 148. The gate 207 is connected to one input of gate 208. The second input of gate 208 is connected to line 209 which leads from gate 203 in selector 138a.

The output clock pulses from selector 138a are applied to a "divide-by-eight" flip-flop network in unit 141a, by way of line 210. Line 210 feeds one input of each of three flip-flops 211, 212 and 213. The output of each of units 211, 212 and 213 feed on an output NAND gate 214. The line 210 is also connected to the fourth input of the output NAND gate 214. Similarly, the line 215 feeds flip-flops 216, 217, 218 and NAND gate 219 in the unit 141bb. The outputs of flip-flops 216, 217 and 218 also feed the NAND unit 219.

With the construction shown in FIGURE 7 the voltage states on lines 148 and 149 control whether or not the pulses clocked out of unit 136 on line 200 appear on line 210 or on line 215. The same is true of the output pulses on line 201 as to whether or not they appear on line 210 or on line 215.

The flip-flop units and the NAND units in quantizer 141a count the pulses down by the factor of eight before they are transmitted to the output line 220. The same action takes place in unit 141bb for control of pulses appearing on line 221. Lines 220 and 221 have been identified in FIGURE 5.

Only two selector circuits 138a and 138bb and two quantizer circuits 141a and 141bb have been shown in FIGURE 7. However, this construction is repeated in pairs in the manner indicated by the omitted portions of FIGURE 5.

In the quantizer circuits shown in FIGURE 7 as well as in the binary line multiplier of FIGURE 6, the flip-flops such as flip-flop 211 and 161 have been indicated in block form only. It is to be understood that in this embodiment of the invention, the flip-flops are JK flip-flops of the type manufactured and sold by Texas Instruments, Inc. of Dallas, Tex., and identified as SN 5470.

As thus far described, two trains of pulses are fed to module 14 for each adjustment that is to be made in the phase shift of unit 31. The two trains of pulses are controlled by operations which are sequential. The first train must be fully generated and applied to the counter 111 before the operation begins which produces the second train of pulses. More particularly, the counter 135 completes its operation to produce a first train of pulses before the counter 136 is placed into operation to produce the second train of pulses.

It will be appreciated that if the generation of the two trains of pulses could be carried out simultaneously, time required to generate a given phase setting on all of the elements in the antenna would be cut approximately in half the time required to carry out the operation above described.

FIGURE 8

Figure 8:
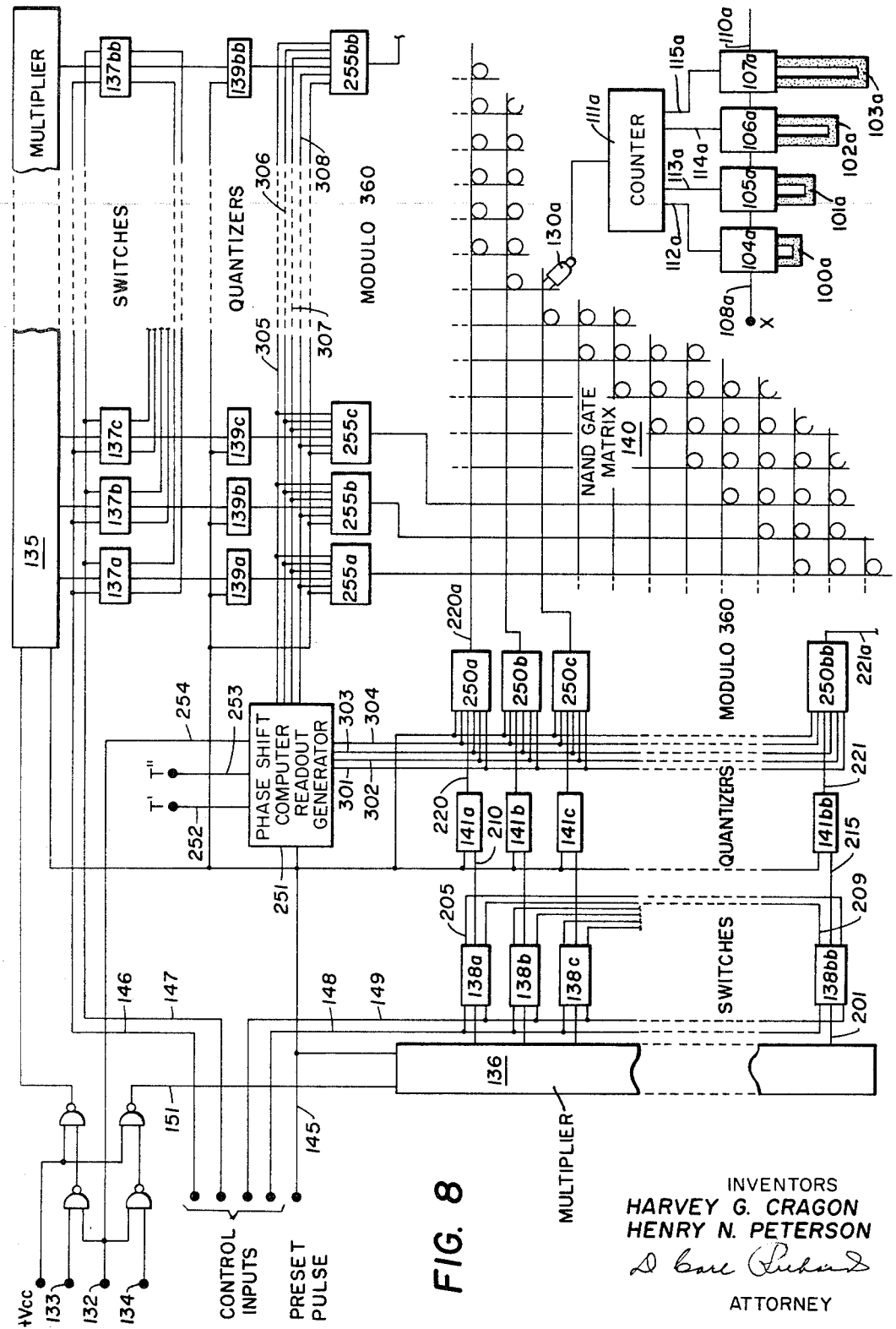
FIGURE 8 illustrates a preferred embodiment of the invention, taken with FIGURES 9 and 10.

In order to accomplish such a time saving and to effect improved operations, the system illustrated in FIGURE 8 is employed. In FIGURE 8, like elements have been given the same reference characters as in FIGURE 5. The binary rate multipliers 135 and 136, FIGURE 8, operate simultaneously to accumulate data which is then fed sequentially to counters for the phase shift units in the antenna modules. The operation is such that the time required to feed precalculated pulses to the counter is very short compared with the time required for the binary rate multipliers 135 and 136 to operate consecutively as is required in FIGURE 5.

In FIGURE 8, only a portion of the circuit of FIGURE 5 has been shown wherein the NAND gate matrix 140 is fed by pulses on the horizontal and vertical lines leading to the matrix. In this case, modulo-360-generators 250a–250bb are connected to the outputs of the quantizers 141a–141bb, respectively. Thus, the modulo-360 generators are interposed between the outputs of the binary rate multiplier 136 and the horizontal lines in the matrix 140. Similarly, modulo-360 generators 255a–255bb are connected to the outputs of quantizers 139a–139bb and thus serve to feed the vertical lines in the matrix 140.

A phase shift computer readout generator 251 is connected by way of lines 301–304 to inputs of each of modulo-360 generators 250a–250bb. Similarly, four lines 305–308 extend from the generator 251 to each of the modulo-360 generators 255a–255bb. Phase shift computer readout generator 251 is provided with three input lines 252, 253, and 254. Clock pulses are fed into the generator 251 by way of line 254. Readout pulses of short duration and in sequence are applied to lines 252 and 253 during radar dead time which occurs immediately preceding transmission of the next radar pulses.

FIGURE 9

Modulo-360 generator

Generator 251 and generator 250a are shown in detail in FIGURE 9. The modulo-360 generator includes four flip-flops 260–263. The pulses from quantizers 141a are fed by way of line 220 to a NAND gate 264, the output of which is applied to each of the flip-flops 260–263. A preset pulse is applied by way of line 145 to each of the flip-flops. The flip-flops are so interconnected that the counter will recycle after each set of 16 pulses is applied by way of line 220. The pulses are counted in binary fashion and the states of the flip-flops appear on the output lines 265–268 at the end of the compute time, that is at the end of the train of pulses appearing on line 220. The states on lines 265–268 are then applied by way of NAND gates 270–273, NOR gate 274, and NAND gate 275 to the line 220a.

It will be noted that provision is included in this circuit for introducing a preset count into the system output. That is, means are provided for presetting the state of the flip-flop 263 so that depending upon the control state applied to terminal 276, the train of pulses applied to line 220a in response to pulses on line 220 may be made to differ by 8 pulses. That is, when a control voltage is applied to terminal 276, then the count on line 220a will differ by 8 pulses from the count if no control voltage is applied to the terminal 276. The circuit to preset the count on the flip-flop 263 includes four NAND gates 277, 278, 279 and 280. The output of NAND gate 280 is applied to the "preset" terminal of flip-flop 263. The output of NAND gate 279 is applied to the "clear" terminal of flip-flop 263. Circuits corresponding to that of gates 277–280 (not shown) may be provided for the flip-flops 260, 261 and 262. With such construction any count may be preset into the generator 250a that may be desired by merely controlling the states on terminal 276 and three additional like terminals.

By reason of the operation of the generator 250a control states will appear on lines 265–268 which will determine whether or not gates 270–273, respectively, are conductive or nonconductive. At the end of each computing interval, the control voltage states thus referred to appear on lines 265–268 and are held at such states until just prior to transmission of the next radar pulse.

During the radar dead time, trains of pulses will be applied to lines 301–304. The pulses will be in number of from a maximum of 8 to a minimum of 1. The pulses are produced in response to 16 clock pulses fed to the phase shift computer readout generator 251 just prior to transmission of the next radar pulse.

FIGURE 9

Phase shift generator 251

The generator 251 comprises four flip-flops 291–294 with three input lines 252–254 and the preset pulse line 145, 8 output lines 301–308. Lines 252–254 are connected to input NAND gates 309 and 310. More particularly, line 254 leads to one input of both of the gates 309 and 310. Line 253 is connected to the second input of gate 309 and line 252 is connected to the second input of gate 310. Gate 311, connected to gate 309, supplies a bus 311a. Gate 312, connected to gate 310, also supplies a bus 312a. The outputs from gates 309 and 310 are both applied to gate 310a which supplies a bus 310b. Bus 312a is connected to one input of each of gates 313, 316, 318 and 320. Similarly, bus 311a is connected to one input of gates 314, 317, 319 and 321. A fixed control voltage source is connected to elements in the generator 251 from the +Vcc terminal 330.

The gates 313, 316, 318 and 320 are connected to output gates 322–325, respectively, while gates 314, 317, 319 and 321 are connected to output gates 326–329, respectively. Gates 322–329 supply output lines 301–308. Lines 301–304 extend to all of the modulo-360 generators which control the horizontal matrix lines of FIGURE 8. Output lines 305–308 extend to all of the modulo-360 generators which control the vertical lines in the matrix 140 of FIGURE 8.

In operation, the output $\bar{A}$ of flip-flop 291 is anded with the output of NAND gates 312 and 311 to provide 8 pulses on output lines 301 and 305, respectively. The output $\bar{B}$ of flip-flop 292 is anded with the outputs of NAND gates 312, 311 and 315 to produce four pulses on output lines 302 and 306, respectively. The output $\bar{C}$ of flip-flop 293, similarly anded in NAND gates 318 and 319, produces two pulses on lines 303 and 307, respectively. Finally, the output $\bar{D}$ of flip-flop 294, similarly anded in NAND gates 320 and 321, produces one pulse on the output lines 304 and 308, respectively.

The NAND gate 313 has two inputs, one of which is the clock pulse on bus 312a and the other is the output $\bar{A}$ of flip-flop 291. In contrast, gate 316 has three inputs: (1) the clock pulse on bus 312a; (2) the output $\bar{B}$ of flip-flop 292; and (3) the complement of the output $\bar{A}$ of flip-flop 291.

The gate 318 has four inputs: (1) the clock pulse on bus 312a; (2) the output $\bar{C}$ of flip-flop 293; (3) the complement of the output $\bar{A}$ of flip-flop 291; and (4) the output B of the flip-flop 292.

Finally, the NAND gate 320 has five inputs: (1) the clock pulse on bus 312a; (2) the output $\bar{D}$ of flip-flop 294; (3) the output C of flip-flop 293; (4) the output B of flip-flop 292; and (5) the complement of the output $\bar{A}$ of flip-flop 291.

It will be understood that the NAND gate 315 is included in order to provide sufficient drive capability for the circuits fed from flip-flop 291.

Since gating of the phase control pulses from multiplier 135 and 136 is controlled by the modulo-360 units under control of the readout generator 251, the need for gates 116–119 of FIGURE 4 is eliminated. Thus, as shown in FIGURE 8, each node in the matrix 140 is connected through an OR gate 130a directly to the phase control counters in the antenna modules. More particularly, counter 111a is connected directly by way of channels 112a–115a to switch units 104a–107a. The voltage states on lines 112a–115a determine whether or not the phase shift loops 100a–103a are included or are excluded from the radar pulsation channel 108a–110a.

While the phase shift loops 100a–103a have been illustrated in FIGURE 8 as having different lengths and thus varying phase shifts, it will be appreciated that different forms of phase shift elements may be substituted for the variable length elements. More particularly, it has been found that transmission lines of the same length but with different loadings may be employed to produce the equivalent phase shift. Such lines would then be connected in place of the different lengths lines 100a–103a.

Thus the outputs of the quantizers are applied as inputs to the modulo-360 generators. The generators consist of four-stage synchronous counters which count the input pulses and recycles every 16 pulses. This produces modulo-360, as 360° of phase shift is equivalent to 16 input pulses. The counter after cycling remains in one of its 16 states until the beginning of the fourth radar dead time, since four radar PRF time periods are used to generate the necessary phase shift. Time gates T' and T'' (generated in timing unit 2, FIG. 3) shown in FIGURE 9 are applied to the readout generator 251 by way of terminals 252 and 253 respectively. T' and T'' are anded in gates 309 and 310 with the clockpulse from terminal 254 (which is identical to terminal 132, see FIG. 8). The pulses drive a synchronous four-stage counter 291–294. The outputs of the counter 291–294 are anded to form two sets of non-coincident pulses on lines 301–304 and 305–308. These pulse trains are inputs to the pulse reconstruction unit 299 of the modulo-360 generator. More particularly, the pulses on lines 301–304 are anded with the binary number stored (on lines 265–268) in the modulo-360 generator counter. The outputs of the four NAND gates 270–273 are ORed together in unit 274 to produce a number of pulses equivalent to the binary number.

This same process is carried out on each row and column line of the NAND gate matrix 140. The pulse sum at each node is then a partial modulo-360. The maximum number of pulses at any one node is 32. Thus the phase shifters need only recycle once to produce the final modulo-360.

By doing the partial modulo-360 on the rows and columns and storing the information until near the end of the radar dead time the input time gates on lines 133 and 134 to the phase shift computer need not be staggered and can be generated simultaneously.

FIGURE 10

FIGURE 10 illustrates a time sequence employed in the system of FIGURES 8 and 9. In this system the binary rate multiplier 135 and 136 may operate simultaneously in response to the gates applied to terminals 133 and 134. It will be recalled that the gate voltage applied to terminal 133 will enable transmission of clock pulses from terminal 132 to multiplier 135 to determine the phase shift across the antenna array in azimuth. Similarly, a gate voltage applied to terminal 134 controls the number of clock pulses fed to the multiplier 136 which determines the phase shift across the antenna array in elevation.

Trains of pulses from multiplier 135 then determines the outputs states on the lines leading from the modulo-360 generators 255a–255bb. Simultaneously, the multiplier 136 determines the outputs from the modulo-360 generators 250a–250bb.

Thus control pulses may be applied to terminals 133 and 134 during the radar dead time preceding each radar pulse.

As shown in FIGURE 10, clock pulses 400 appear at terminal 132 of FIGURE 8. The gate voltage 401 and 402 are applied to terminal 133 and 134, respectively. Thus clock pulses represented by the train 403 are applied to the multiplier 135 and pulses represented by the train 404 are applied to the multiplier 136. Thus in the interval preceding a dead time trigger 405 the modulo-360 units have been provided with pulses to establish counts therein representative of the desired phase shift. Thereafter a gate 406 of length equal to 16 clock pulses is applied to terminal 252. In order to provide a proper output unit from the phase shift computer readout generator 251, a second train of clock pulses 400a is employed along with the pulses 400. Pulses 400a occur at the same rate as the pulses 400 but at points along the time scale midway between the clock pulses 400. Thus, the train 400a is provided within the phase shift computer readout generator 251. The application of voltage gate 406, identified in FIGURES 8–10 as gate T′, will pass the two trains of pulses 407 and 408 for use in the modulo-360 units. By this means there will be produced eight pulses 409 on line 301, four pulses 410 on line 302, two pulses 411 on line 303, and one pulse 412 on line 304.

With such trains of pulses appearing on lines 301–304, the modulo-360 generators will then enable the NAND gates, such as NAND gates 270–273, FIGURE 9, to transmit pulses to counter 111a in any number from one to a maximum of 16.

A second voltage gate 413 identified in FIGURES 8–10 as gate T″ will be applied to generator 251 to apply similar sets of pulses under control of modulo-360 generators onto lines 305–308. The pulses on lines 301–304 and on lines 305–308, as enabled by the modulo-360 units, then are stored in counter 111a and are held until a reset pulse is applied to the counter 111a. During the interval that the count is held in the counter 111a, the radar pulse is transmitted through the phase shift network by way of channel 108a–110a.

The flip-flops employed in the circuit of FIGURE 9 are of the same type as employed in FIGURES 6 and 7, and for this reason a detailed description of the internal construction and interconnection of the elements has been omitted since these features are well known.

Having described the invention in connection with certain specific embodiments thereof, it is to be understood that further modifications may now suggest themselves to those skilled in the art and it is intended to cover such modifications as fall within the scope of the appended claims.

We claim:

1. A system for dynamically controlling the directional character of a line of elements in a phased antenna which comprises:
   (a) separate selectively variable delay means in each of said elements through which radar signals must pass,
   (b) a first counter having outputs of decreasing order and in number corresponding with the number of elements in said line,
   (c) a source of clock pulses,
   (d) means for applying said clock pulses to said first counter during a time gate proportional to the desired radiation angle of said line of elements,
   (e) separate counter and switch means for control of each of said delay means,
   (f) circuit means for transmitting pulses from the outputs of said first counter to said separate counter means with correspondence between the locations of elements in said line and the positions of outputs of said first counter, and
   (g) means operative following application of said clock pulses to said first counter for actuating said switch means to vary the effective lengths of said delay means in dependence upon the counts in their respective separate counters preparatory to transmission of signals through said elements.

2. The combination set forth in claim 1 in which said first counter is a binary rate counter.

3. The system of claim 1 wherein modulo-360 generators are included in each output of said first counter.

4. The system of claim 3 wherein each modulo-360 generator includes means to introduce a present count therein with selected reset pulses applied thereto.

5. A system for dynamically controlling the directional character of a two-dimensional multimodule antenna which comprises:
   (a) separate selectively variable delay means within each said module through which radar signals must pass,
   (b) a first counter having outputs of decreasing order and in number corresponding with the number of modules in one dimension of said antenna,
   (c) a second counter having outputs of decreasing order and in number corresponding with the number of modules in a second dimension of said antenna,
   (d) a source of clock pulses,
   (e) means for applying said clock pulses to said first counter during a time interval proportional to the desired azimuth angle,
   (f) means for applying said clock pulses to said second counter during a time interval proportional to the desired elevation angle,
   (g) separate switching counters and switch means for each of said delay means,
   (h) circuit means for sequentially transmitting pulses from the outputs of said first and second counters to said switching counters with correspondence between the locations of the modules in said antenna and the positions of the outputs of said first and second counters to actuate said switch means to vary the electrical lengths of said delay means in dependence upon the count in their respective counters preparatory to transmission of radar signals therethrough.

6. A system for dynamically controlling the directional character of a two-dimensional multimodule antenna which comprises:
   (a) separate selectively variable delay means within each said module through which radar signals must pass,
   (b) a first counter having outputs of decreasing order and in number corresponding with the number of modules in one dimension of said antenna,
   (c) a second counter having outputs of decreasing order and in number corresponding with the number of modules in a second dimension of said antenna,
   (d) a source of clock pulses,
   (e) means for applying said clock pulses to said first counter during a time interval proportional to the desired azimuth angle,
   (f) means for applying said clock pulses to said second counter during a time interval proportional to the desired elevation angle,
   (g) separate switching counters and switch means for each of said delay means,
   (h) circuit means for transmitting pulses from the outputs of said first and second counters to said switching counters with correspondence between the locations of the modules in said antenna and the positions of the outputs of said first and second counters, and
   (i) means operative following application of said clock pulses to said first and second counters to actuate said switch means to vary the electrical lengths of said delay means in dependence upon the count in their respective counters preparatory to transmission of radar signals therethrough.

7. The method of dynamically controlling the directional character of a two dimensional phased array antenna which comprises:
   (a) generating a first train of clock impulses of length proportional to the desired azimuth angle,
   (b) generating a second train of clock pulses of length proportional to the desired elevation angle,
   (c) from said first train, producing a first set of secondary trains of pulses in number corresponding with the number of elements arrayed along one dimension of said antenna and with the trains of said first set grated in length in dependence upon locations of said elements across said antenna,
   (d) from said second train producing second set of secondary trains of pulses in number corresponding with the number of elements arrayed along a second dimension of said antenna with the trains of said second set graded in length in dependence upon location of said elements across said antenna, and
   (e) adjusting the electrical length of the radar path leading to each element in response to the sum of pulses in pairs of different trains of said secondary pulses where one train of each pair is derived from said first set and the other from said second set.

8. The method according to claim 7 wherein said first and second trains of pulses are produced simultaneously and wherein said first and second sets are employed sequentially.

9. The method according to claim 7 wherein said first and second sets of pulses are each connected to modulo-360 and are thereafter sequentially applied to each said element.

10. A system for dynamically controlling the directional character of af line of elements in a phased antenna which comprises:
   (a) separate selectively variable delay means in each of said elements through which radar signals must pass,
   (b) means for varying the effective lengths of said delay means,
   (c) a first counter having outputs of decreasing order and in number corresponding with the number of elements in said line,
   (d) a source of clock pulses,
   (e) means for applying said clock pulses to said first counter during a time gate proportional to the desired radiation angle of said line of elements, and
   (f) circuit means for transmitting pulses from the output of said counter to said means for varying with correspondence between the locations of elements in said line and the positions of outputs of said counter to vary the effective lengths of said delay means.

References Cited

UNITED STATES PATENTS 3,324,452   6/1967   Brightman et al. ___ 343—100 X

RODNEY D. BENNETT, *Primary Examiner.*

T. H. TUBBESING, *Assistant Examiner.*